(12) United States Patent
Hofmann et al.

(10) Patent No.: US 10,215,267 B2
(45) Date of Patent: Feb. 26, 2019

(54) VALVE CLOSING DEVICE AND VALVE ACTUATING ASSEMBLY

(71) Applicant: AUMA Riester GmbH & Co. KG, Mullheim (DE)

(72) Inventors: Benjamin Hofmann, Heitersheim (DE); Wilfried Platzer, Freiburg (DE)

(73) Assignee: AUMA Riester GmbH & Co. KG, Müllheim (DE)

( * ) Notice: Subject to any disclaimer, the term of this patent is extended or adjusted under 35 U.S.C. 154(b) by 768 days.

(21) Appl. No.: 14/773,002

(22) PCT Filed: Mar. 5, 2014

(86) PCT No.: PCT/EP2014/000558
§ 371 (c)(1),
(2) Date: Sep. 4, 2015

(87) PCT Pub. No.: WO2014/135274
PCT Pub. Date: Sep. 12, 2014

(65) Prior Publication Data
US 2016/0017974 A1   Jan. 21, 2016

(30) Foreign Application Priority Data
Mar. 5, 2013   (DE) .................. 10 2013 003 810

(51) Int. Cl.
*F16H 48/06* (2006.01)
*F03G 1/00* (2006.01)
*F03G 1/02* (2006.01)
*F16K 31/04* (2006.01)

(52) U.S. Cl.
CPC ............... *F16H 48/06* (2013.01); *F03G 1/00* (2013.01); *F03G 1/02* (2013.01); *F16K 31/047* (2013.01)

(58) Field of Classification Search
None
See application file for complete search history.

(56) References Cited

U.S. PATENT DOCUMENTS

| | | | |
|---|---|---|---|
| 4,669,578 A * | 6/1987 | Fukamachi | ........... F16K 31/043 185/40 R |
| 4,921,208 A | 5/1990 | LaMarca | |
| 5,029,682 A * | 7/1991 | Maurer | .................. B60T 1/062 192/216 |
| 6,173,939 B1 | 1/2001 | Dottavio et al. | |

(Continued)

FOREIGN PATENT DOCUMENTS

| | | |
|---|---|---|
| DE | 2313698 | 10/1974 |
| DE | 19519638 | 12/1996 |

(Continued)

*Primary Examiner* — Colby M Hansen
(74) *Attorney, Agent, or Firm* — Volpe and Koenig, P.C.

(57) ABSTRACT

For a valve closing device (8), including an output shaft (9) for connecting a valve (3) and an input shaft (10) for connecting an actuating drive (2), it is provided that an emergency drive (11) for driving the output shaft (9) in the event of a mains power failure is designed as a constant force spring motor (28) and/or a force flow from the emergency drive (11) to the output shaft (9) is merged with a force flow from the input shaft (10) to the output shaft (9) by an overriding gear arrangement (16) and/or the emergency drive (11) is locked and released by a locking device (19).

18 Claims, 13 Drawing Sheets

(56) References Cited

U.S. PATENT DOCUMENTS

| | | | | |
|---|---|---|---|---|
| 6,544,139 | B1* | 4/2003 | Gierer | F16H 61/0206 |
| | | | | 475/116 |
| 8,360,393 | B2* | 1/2013 | Park | F16K 31/53 |
| | | | | 251/129.03 |
| 8,708,852 | B2* | 4/2014 | Park | F16K 31/56 |
| | | | | 475/4 |

FOREIGN PATENT DOCUMENTS

| | | |
|---|---|---|
| GB | 2388177 | 11/2003 |
| RU | 2252445 | 1/2005 |
| RU | 2350813 | 3/2009 |

\* cited by examiner

VALVE CLOSING DEVICE AND VALVE ACTUATING ASSEMBLY

BACKGROUND

The invention relates to a valve closing device having a driven shaft and having an input shaft which is coupled to the driven shaft and by means of which the driven shaft is drivable in normal operation, and having an emergency drive, wherein the driven shaft is transferrable additionally by the emergency drive from a position of use into an end position.

The invention further relates to a valve actuating assembly having an actuating drive for actuating, in the event of mains operation, a driven shaft which is operatively connectable or operatively connected to a valve and having a valve closing device for actuating the driven shaft in the event of mains failure.

These types of valve closing devices are known, for example, from technical systems in which a mass flow is controlled or regulated by means of valves. In this connection, the valves are actuated in normal operation by way of corresponding actuating drives. In the event of a mains failure, for example in the event of an electric power failure or in the event of a failure of a hydraulic or pneumatic supply to the actuating drives, the valve closing devices serve for the purpose of transferring the driven shaft into a pre-defined end position in order to transfer the valve connected in each case into a defined end state, for example into an open state or a closed state.

In order to be independent of the power supply via the already mentioned mains system, it is known in the event of mains failure to store the energy that is necessary for transferring the driven shaft into the desired end position in a mechanical manner using a spiral spring or a coil spring.

The known valve closing devices are used as an assembly part or are integrated into valve actuating assemblies of the type described in the introduction.

A defined torque is necessary, as a rule, to actuate the valve. In the case of the known emergency drives with mechanical energy storage in a spiral or coiled spring, the torque that can be developed by the emergency drive to actuate the driven shaft reduces during the energy releasing operation. The spiral or coiled spring consequently has to be sized such that there is still enough torque developed even at the end of the actuation movement. Conversely, this means that a tensioning device for tensioning the emergency drive has to be sized large enough such that even the spring force close to the tensioned state of the emergency drive is overcome. This tensioning device consequently has to be sized large enough, as a rule, such that a multiple of the torque that is actually necessary for actuating the driven shaft is able to be developed. The emergency drive is frequently tensioned by the already mentioned actuating drive for normal operation, the result of which is that the actuating drive is oversized for its usual tasks.

SUMMARY

The object underlying the invention is to reduce the sizing requirements for a valve actuating assembly.

To achieve this object one or more features according to the invention are provided. In particular, it is provided according to the invention in the case of a valve closing device of the type described in the introduction that the emergency drive is provided as at least one constant force spring motor. Constant force spring motors are known per se and are used, for example, in toys or in cable rewind drums, blinds and many more things. They are distinguished from other storage means for mechanical energy based on the developed torque being almost constant or even precisely constant over the energy releasing operation. They are consequently also designated as constant force springs. The advantage of using at least one constant force spring motor in the case of an emergency drive of the valve closing device of the type described in the introduction is that a lower maximum torque is necessary during the tensioning of the emergency drive. This is due to the fact that the necessary torque at the start of the tensioning operation only has to be slightly above the torque that is necessary to actuate the driven shaft. During the course of the tensioning operation, this necessary torque is substantially constant such that it is not necessary during tensioning to develop a multiple of the required torque of the emergency drive. As a result, the sizing of the emergency drive and of a tensioning device of the emergency drive can be clearly smaller than has been usual up to now.

The valves addressed here where the invention can be used in an advantageous manner can be, for example, a valve or a ball tap. The valve is consequently adjustable by way of the emergency drive and by an actuating drive which is connectable or connected to the input shaft as an alternative or at the same time.

In the case of a development of the invention, it can be provided that the at least one constant force spring motor is tensionable by way of the input shaft. The advantage in this case is that an additional tensioning device can be omitted. Rather, the at least one constant force spring motor is tensionable in normal operation by an actuating drive that is connected to the input shaft.

As an alternative to this or in addition to it, it can be provided that the at least one constant force spring motor is tensionable by way of a tensioning-device. The tensioning device is preferably electrically operated, however hydraulic or pneumatic tensioning devices can also be used in an advantageous manner. The advantage of the development with a tensioning device is that the sizing of a connected actuating drive can be chosen independently of the emergency drive and can be matched to the respective requirement of the connected valve.

In a further development of the invention, it can be provided that the at least one constant force spring motor comprises at least one band-shaped spring element. The advantage here is that the at least one band-shaped spring element can be tensioned or untensioned in a simple manner for developing the desired torque and for tensioning.

In this connection, it can be provided that the at least one band-shaped spring element is coiled in a spiral manner in an energy-released state. It is particularly expedient when, for tensioning the at least one constant force spring motor, the at least one band-shaped spring element is wrapped around at least one further roller from the spiral-shaped coiling of the energy-released state. To achieve a higher torque, at least two, in particular at least three or more than three, band-shaped spring elements are wrapped around one common roller for the tensioning in each case of one associated roller. In this connection, the at least two band-shaped spring elements can cooperate with the commonly utilized roller at target points which are offset with respect to one another in the circumferential direction of the commonly utilized roller. It can be achieved as a result that the at least two band-shaped spring elements, in the wrapped around state or the tensioned state, are tensioned on top of one another in such a manner in a common axial portion of the commonly utilized roller that an at least double-flight winding is formed. It can also be provided conversely that, for tensioning, at least two, in particular at least three or more than three, band-shaped spring elements are tensioned from one common roller onto in each case a roller that is associated with the individual spring elements. In this connection, the at least two band-shaped spring elements can form an at least double-flight winding in the energy-released state. The terms "axial", "radial" and "in the circumferential direction" refer to the respective roller in this description. It can also be provided that the at least two band-shaped spring elements are tensioned around pairs of rollers that are separated from one another, one roller of a pair of rollers being coupled with a roller of at least one other pair of rollers, for example as a result of an arrangement on a common shaft.

It is particularly expedient when the roller is operatively connected to or coupled with a drive shaft of the emergency drive, from which the at least one spring element is untensioned when the energy is being released. The advantage in this case is that this roller is consequently subject to tensile stress for driving.

It can consequently be provided that the at least one constant force spring motor is tensionable as a result of untensioning at least one spring element, for example the already mentioned at least one band-shaped spring element. In a preferred manner, in this connection, the at least one spring element can be untensioned from a first roller. The torque that the emergency drive develops in its operation depends consequently on the diameter of said first roller. In the case of a correspondingly thin at least one spring element, the roller diameter is only changed insignificantly during tensioning or untensioning. This is particularly beneficial for constant torque generation.

For storing the mechanical energy, it can be provided that in a tensioned state at least one spring element, for example the already mentioned at least one spring element, of the at least one constant force spring motor is tensioned in opposition to a preferred tensioning direction. To this end, it is possible to provide a second roller, around which the at least one spring element is tensioned for tensioning the at least one constant force spring motor.

In a further development of the invention, it can be provided that the emergency drive comprises at least two constant force spring motors connected in parallel. The advantage in this case is that the torque to be developed can be applied by several individual drives. Consequently, it is achievable for the individual constant force spring motors to have to apply a smaller torque in each case and to be able to be designed consequently for a smaller torque. Motors connected in parallel is to be understood in this case as an arrangement in which the torque developed by the individual motors is added up. In this connection, the motors can drive, for example, one common toothed part or several toothed parts which are coupled together in a rigid manner and are associated in each case with one motor.

In this connection or in the case of a further development of the invention, it can be provided that the at least one constant force spring motor drives the driven shaft by means of a gearing arrangement. The advantage in this case is that a torque developed by the individual constant force spring motor is adaptable to a necessary torque for actuating the output. It is expedient in this connection when the gearing arrangement is realized as a reduction gearing arrangement. It is advantageous for a large torque to be able to be developed and applied onto the driven shaft. In a preferred manner, the gearing arrangement is a multi-stage reduction gearing arrangement. Consequently, large gear ratios can be realized in a small space.

The described arrangement of at least two constant force spring motors connected in parallel and/or of at least one constant force spring motor coupled by means of a reduction gearing arrangement results in the individual constant force spring motors only having to apply a small torque. The advantage of this is that the rollers onto which the spring elements are tensioned or from which the spring elements are untensioned, can be realized with a larger diameter. This extends the service life of the constant force spring motor or of the constant force spring motors in a considerable manner as the spring elements are subject to less load. For many applications the service life achievable with smaller diameters is, however, sufficient such that the advantage of a smaller installation space that is present in the case of these variants prevails.

The parallel arrangement of several constant force spring motors, for example two, three, four or more than four, for example ten or more than ten, constant force spring motors, can be set up such that the torque developed by one constant force spring motor is not sufficient to actuate the driven shaft. This results in contrast in a redundant design, where each constant force spring motor could actuate the driven shaft on its own, with the purpose of the constant force spring motors together not being able to exceed a maximum required or admissible torque. In other words, the design takes into consideration the fact that the individual constant force spring motors are not separately disconnectable.

The advantage of using the constant force spring motors connected in parallel is that it is possible to realize a modular system where, depending on the requirement, individual or several constant force spring motors can be used. In this way, it is possible to cover or reproduce a step range of torques for actuating drives. For example, a step range of 60 Nm, 120 Nm and 240 Nm can be realized.

A solution according to the invention of independent inventive significance provides in the case of a valve closing device of the type described in the introduction that the emergency drive is coupled with the driven shaft by a superposition gear arrangement. The advantage in this case is that the tensioning of the emergency drive and the connecting of the emergency drive in the event of mains failure are realizable in a simple manner. In this connection, a superposition gear arrangement is to be understood as a gearing arrangement with two input points and one driven shaft, the torques admitted by the input points in each case—where applicable by means of a gear ratio—being provided are totaled up at the driven shaft. It is possible to dispense with couplings in the power train of the emergency drive by using a superposition gear arrangement. It is particularly expedient when the superposition gear arrangement is realized as a differential gearing arrangement or as an epicyclic gearing arrangement, in particular as a four-wheel planetary gearing arrangement in a basic design or with a method of operation describing a power train, it being possible to have additional planetary wheels for reinforcement. In this case, the mentioned input points are provided by an input shaft and a planet gear carrier. It is particularly expedient when the emergency drive, in the case of a valve closing device of the type described initially according to the invention is provided. The advantage in this case is that the described preferences of the constant force spring motor are able to be combined with the described coupling of the torque from the emergency drive in the event of mains failure. A usable epicyclic gearing arrangement can be characterized, for example, in that there are two sun wheels which are preferably coaxially arranged, a first of the sun wheels being connected to an input shaft and a second of the sun wheels being connected to an output shaft of the superposition gear arrangement and the sun wheels being coupled together by at least one planetary wheel block. The at least one planetary wheel block can comprise a single planetary wheel which meshes with the two sun wheels or two planetary wheels which are coupled rigidly with one another on one shaft and in each case mesh with only one of the two sun wheels. In a preferred manner, the number of planetary wheel blocks arranged along the circumferences of the sun wheels corresponds precisely to a difference in the number of teeth between the individual sun wheels with respect to one another. It is particularly expedient when each planetary wheel block comprises a standard number of teeth. It is advantageous when using epicyclic gearing arrangements that between the input shaft and the output shaft of the superposition gear arrangement a gear ratio of almost one can be set up. It is further advantageous in the case of the described type of superposition gear arrangement that a direction of rotation between the input shaft and the output shaft is maintained and, in particular, a reversal of direction of rotation is avoided. A gear ratio that lies between 0.8 and 1.2, in a preferred manner between 0.9 and 0.95 or between 1.05 and 1.1 is favorable. It is further advantageous that the emergency drive, for example a constant force spring motor of the described type, is couplable to the output shaft by a planetary carrier which carries the at least one planetary wheel block. Here, speed reducing gear ratios of more than 8, in a preferred manner 10 or more than 10, for example 15, from the emergency drive to the output shaft are achievable. Consequently, the emergency drive can develop a necessary, comparatively high torque by means of the output shaft in order to close or to open a valve or to set it in general.

In a further development of the invention, it can be provided that the input shaft and the driven shaft are coupled by a superposition gear arrangement, for example the superposition gear arrangement already mentioned. It is advantageous in this case that a simple option is created to couple an emergency drive into the power train between the input shaft and the driven shaft.

In a further development of the invention, it can be provided that the emergency drive drives a planet gear carrier of a, in particular of the already mentioned superposition gear arrangement. The advantage is this case is that a gear ratio of almost or precisely 1:1 can be set up between the input shaft and the driven shaft. This is particularly favorable in order to be able to achieve the same sizing (nominal torque, nominal speed etc.) of the connectable actuating drive as would be necessary without the described valve closing device (i.e. without the additional emergency drive). As a result, simple in-retro-fitting is possible, for example in the case of an existing actuating drive-fitting combination.

In a further development of the invention, it can be provided that a regulating device is present and is set up for regulating a tensioning device of the emergency drive such that a rotational movement of the input shaft is compensatable such that a desired rotational movement, in particular a standstill, of the driven shaft is stopped when the emergency drive is tensioned. For example, the desired rotational movement can be a rotational movement at a speed of zero, this means a standstill, or a rotational movement at a constant speed. The advantage in this case is that it is possible to tension the emergency drive without adjusting the valve. This is particularly advantageous when tensioning the emergency drive forcibly involves a rotational movement or pivoting movement or linear movement of the associated input point on the superposition gear arrangement, as is the case, for example, with a constant force spring motor.

A regulating method of possibly independent inventive quality is also provided where a speed and/or a torque of a tensioning device is adjusted such that a rotational movement (here introduced by an actuating drive) on an input shaft of a superposition gear arrangement is compensated for such that a driven shaft of the superposition gear arrangement, which is monitored preferably by way of a sensor, carries out a desired rotational movement, for example a constant rotational movement or a standstill. Instead of or in addition to the rotational movement of the driven shaft, the movements at the input points of the superposition gear arrangement can also be monitored and are monitored by way of respective sensors. By way of the known or filed gear ratios of the superposition gear arrangement, it is possible, as a result, to determine the rotational movement of the driven shaft for monitoring purposes.

Here a sensor can be provided which is set up for detecting a rotational movement of the driven shaft. In a preferred manner, the sensor is operatively connected to the regulating device. Consequently, a regulating circuit is formable and is formed in the case of a development.

In a further development of the invention of independent inventive significance, it is provided in the case of a valve closing device of the type described in the introduction that a locking device is set up for locking the emergency drive in the event of mains operation and/or for releasing the emergency drive in the event of mains failure. The advantage in this case is that the emergency drive is deactivatable in a simple manner in normal operation. For example, it can be provided that the locking device automatically releases the emergency drive when a mains failure is ascertained. The locking device can be set up to interrupt the power train in one sense of direction or in both senses of direction.

In the case of a development of the invention, it can be provided that the locking device is realized as a self-locking gearing arrangement which is drivable by the emergency drive. The advantage in this case is that it is achievable in a simple manner for the emergency drive to be uncoupled from the main train between the input shaft and the driven shaft. A separate tensioning device can be provided for tensioning the emergency drive, insofar as it is mechanically driven. However, it can also be provided that the emergency drive is driven in a pneumatic, electric or hydraulic manner.

In a further development of the invention, it can be provided that the locking device comprises a pawl which is movable between a locking position and a releasing position, wherein the pawl interacts in a locking manner in the locking position with a gearing part which is drivable by the emergency drive. Consequently, it is achievable for the locking device to block the emergency drive or the already mentioned superposition gear arrangement or a further gearing part in the power train between the emergency drive and the driven shaft in a locking manner.

In a further development of the invention, it can be provided that the gearing part is a planet gear carrier, for example the already mentioned planet gear carrier of a superposition gear arrangement. The advantage in this case is that in a simple manner it is possible to control whether a torque developed by the emergency drive strikes the power train between the input shaft and the driven shaft or not.

In a further development of the invention, it can be provided that a disengaging device is set up for transferring a pawl, for example the already mentioned pawl, into the releasing position. The advantage in this case is that the locking of the locking device is releasable in a simple manner. It is particularly favorable when the disengaging device is motor-operated. This can be set up so as to be motor-operated in an electrical, pneumatic, hydraulic or other manner.

In a further development of the invention, it can be provided that a, in particular the previously mentioned, disengaging device, of a, in particular the previously mentioned, pawl of the locking device is realized as a lifting magnet. The advantage in this case is that the disengaging device is holdable in the locking position in an electromagnetic manner such that in the event of a mains failure the locking device automatically actuates the power train from the emergency drive. The lifting magnet, in this connection, can be coupled with a return spring.

In a further development of the invention, it can be provided that the pawl is realized on the free end of a toggle lever. The advantage in this case is that with a toggle lever in the extended state a high level of holding force can be developed. Conversely, when a toggle lever is used, there is the advantage that an initial force to disengage the pawl out of the extended state of the toggle lever has to be low. A toggle lever is to be understood in general as two legs which are pivotably interconnected and are pivotably mounted on an end remote from the connected joint, the other end remote from the connecting joint being realized as a free end.

In a further development of the invention, it can be provided that a, for example the previously mentioned, disengaging device of a, for example the previously mentioned, locking device cooperates with a joint of the toggle lever. In a preferred manner, the disengaging device cooperates in a transverse manner with respect to the extended toggle lever. The advantage in this case is that the force developed by the disengaging at the start of the disengaging movement is transferrable to the pawl at a high gear ratio, the gear ration decreasing during the course of the disengaging movement. Consequently, the pawl can also be disengaged when the locked gearing part acts on the pawl with a force or a torque and thus prevents a movement of the pawl.

One or more features are provided according to the invention to achieve the named object in the case of a valve actuating assembly. The advantage in this case is that an actuating drive of the valve actuating assembly can be sized as small as possible and that the emergency drive is connectable and separable from the power train between the input shaft and the driven shaft in a simple manner.

In an advantageous development, it can be provided that the valve closing device is integrated into the actuating drive. The advantage in this case is that a compact valve actuating assembly is provided.

As an alternative to this or in addition to it, it can be provided that the valve closing device is connected releasably to the actuating drive as a separate unit. The advantage in this case is that the valve closing device can be retrofitted and in that a valve closing device is combinable with a plurality of actuating drives in order to form a valve actuating assembly according to the invention.

In a further development of the invention, it can be provided that a valve for producing an operative connection is connected to the driven shaft. The advantage in this case is that the valve actuating assembly is usable for use in a technical system with a valve that regulates mass flow.

BRIEF DESCRIPTION OF THE DRAWINGS

The invention is now described in more detail by way of exemplary embodiments, but is not limited to these exemplary embodiments. Further exemplary embodiments are produced as a result of the combination of the features of individual or several claims together and/or with individual or several features of the exemplary embodiments, in which:

DETAILED DESCRIPTION OF THE PREFERRED EMBODIMENTS

Figure 1:
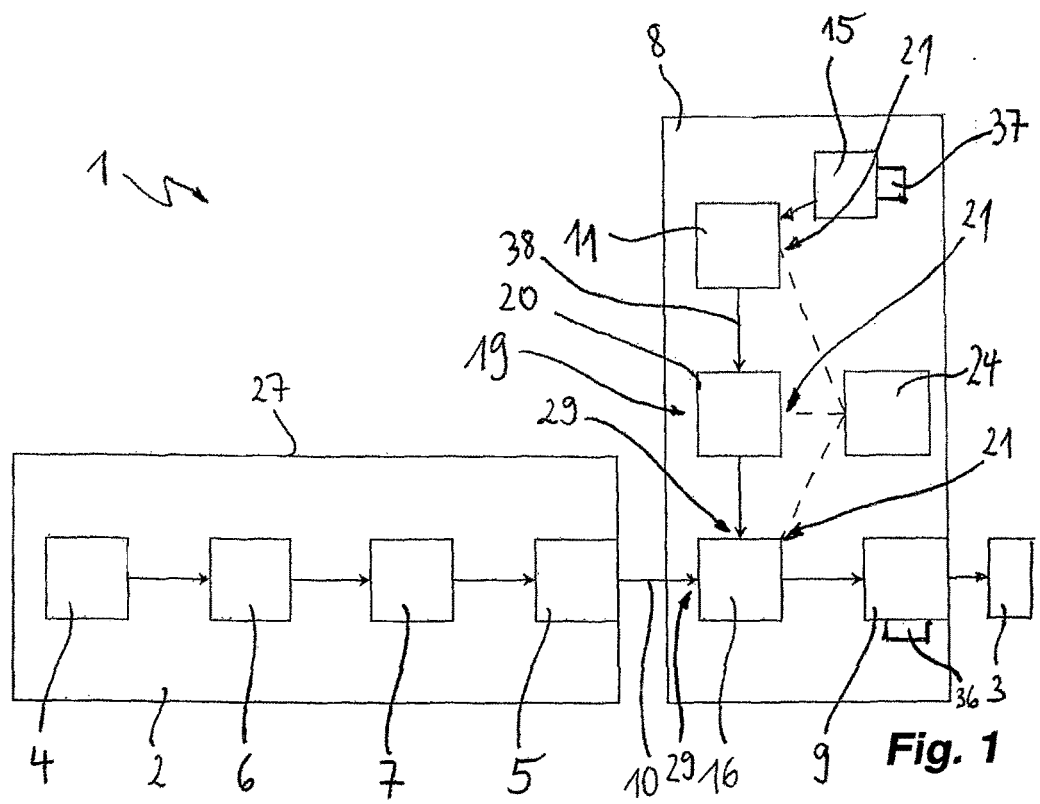
FIG. 1 shows a highly schematic block diagram representation of a valve actuating assembly according to the invention with a valve closing device and actuating drive according to the invention to explain the principle according to the invention.

FIG. 1 shows a highly simplified block diagram of a valve actuating assembly according to the invention given the overall reference of 1.

The valve actuating assembly 1 has an actuating drive 2 by which a connectable or connected valve 3 can be operated.

The actuating drive 2, in this connection, comprises in a manner known per se a motor 4 by which an output 5 is drivable.

The motor 4, in this connection, can be drivable in an electric, pneumatic, hydraulic or other manner.

A brake 6 and a gearing arrangement 7 are also arranged in a known manner per se between the motor 4 and the output 5. The power train between the motor 4 and the output 5 can be interrupted by way of the brake 6. The brake 6 can be omitted, where applicable, when the gearing arrangement 7 is self-locking.

A valve closing device 8 according to the invention, which is described in more detail below, is arranged between the actuating drive 2 and the valve 3.

The valve closing device 8 comprises a driven shaft 9 to which the already mentioned valve 3 is connectable for producing an operative connection. FIG. 1 shows the connected valve 3 after producing the operative connection.

The valve closing device 8 also has an input shaft 10,

The already mentioned actuating drive 2 is couplable to the input shaft 10.

FIG. 1 shows the actuating drive 2 coupled to the valve closing device 8. The coupling is releasable in the case of the exemplary embodiment according to FIG. 1, and the valve closing device 8 is realized as a separate unit.

The input shaft 10 is coupled with the driven shaft 9 such that the driven shaft 9 is drivable by way of the actuating drive 2 in normal operation in order to actuate the valve 3 or another connected valve.

The valve closing device 8 further comprises an emergency drive 11. In the event of mains failure, that is if the actuating drive 2 is inoperative, the driven shaft 9 is drivable by way of the emergency drive 11 which is driven by way of the electric motor or mechanically, pneumatically or hydraulically at least until the driven shaft 9 is transferred into a defined end position.

This end position can be defined such that a connected valve assumes a defined end state, for example a completely closed state or a completely open state.

Figure 2:
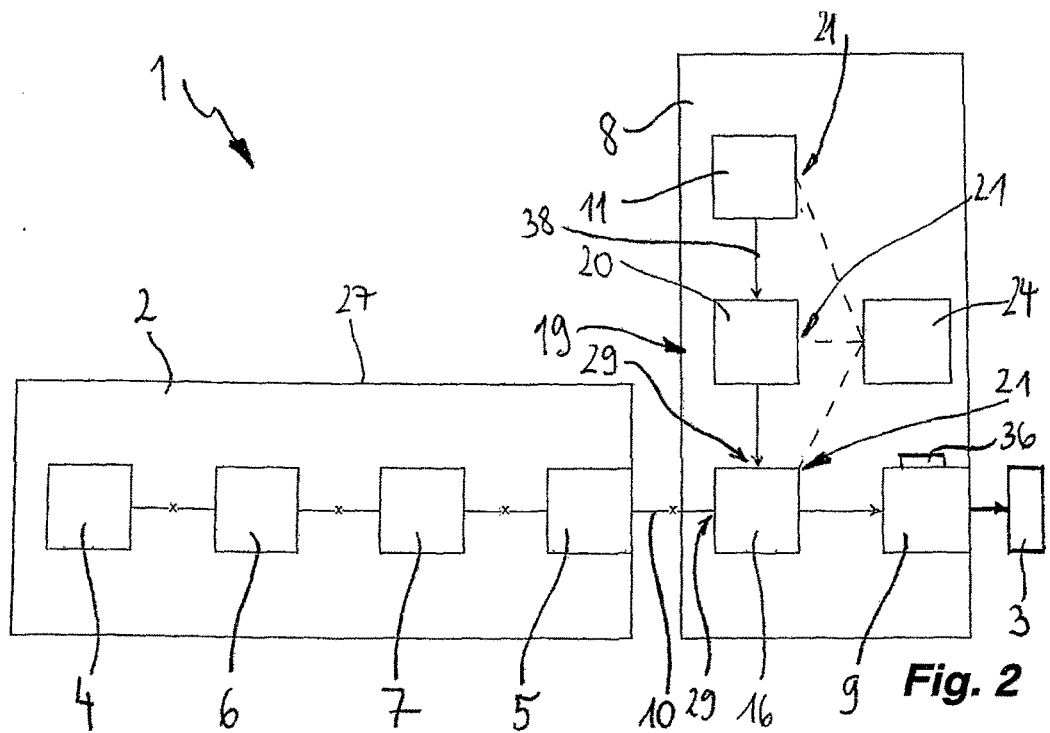
FIG. 2 shows the power train in the case of a mains failure in a valve actuating assembly according to FIG. 1.

FIG. 2 shows the power train in the event of a mains failure.

The symbol "x" indicates that the power train between the motor 4 and the input shaft 10 is blocked. This can be achieved, for example, as a result of the brake 6 automatically coming in the event of a mains failure.

In this case, it is provided that the emergency drive 11 drives the driven shaft 9 in the described manner.

In the case of the exemplary embodiment shown, the emergency drive 11 is realized for mechanical operation as a constant force spring motor.

Figure 3:
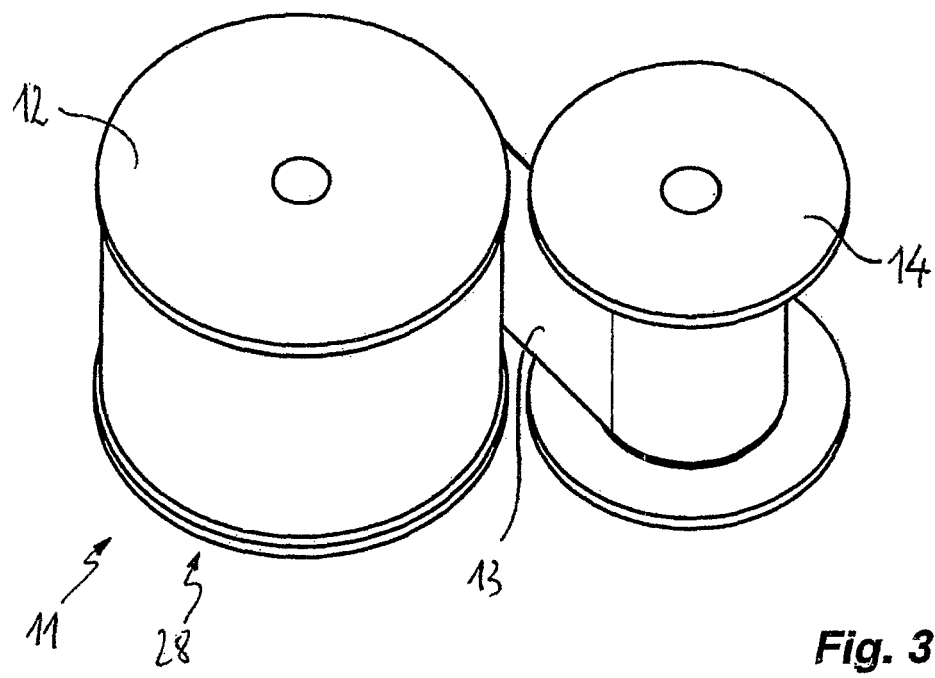
FIG. 3 shows a constant force spring motor of a valve actuating assembly according to FIG. 1.

Such a constant force spring motor 28 as an emergency drive 11 is shown in FIG. 3.

The emergency drive 11 has a first roller 12 onto which a band-shaped spring element 13 is coiled.

FIG. 3 shows the emergency drive 11 in the tensioned state.

Figure 4:
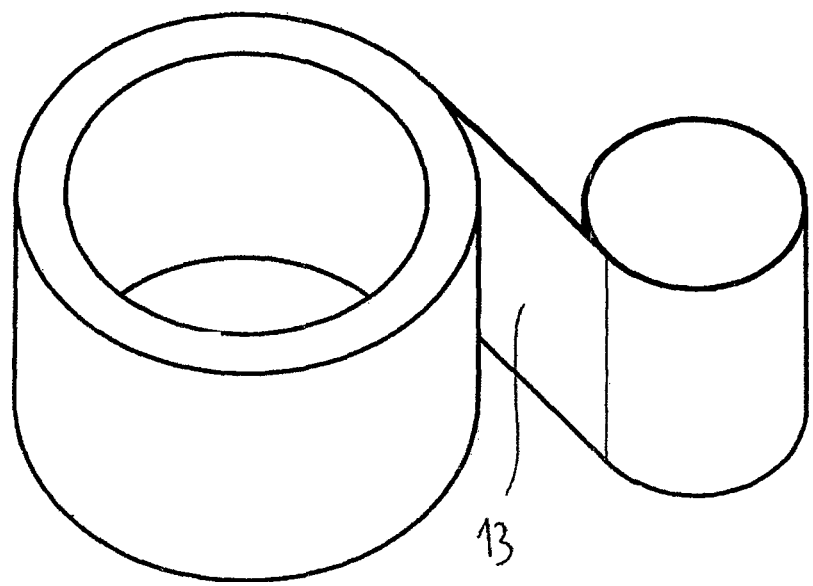
FIG. 4 shows a coiled, tensioned band-shaped spring element of the constant force spring motor according to FIG. 3.

FIG. 4 shows the spring element 13 of the emergency drive 11 from FIG. 3.

It is apparent that the spring element 13 is coiled in a spiral manner on the first roller 12.

The emergency drive 11 has a second roller 14 which does not have anything wrapped around it in the tensioned state according to FIG. 3.

To tension the emergency drive 11, the band-shaped spring element 13 is consequently coiled onto the first roller 12.

In this connection, the spring element 13 is unrolled by the second roller 14. The spring element 13 is consequently coiled onto the first roller 12 from the second roller 14.

During the coiling process, the first roller 12 and the second roller 14 are moved in opposite directions.

The achievement as a result is that in the tensioned state of the emergency drive 11, that is when the spring element 13 is completely tensioned onto the first roller 12, the spring element 13 is coiled in opposition to a preferred direction of rotation.

If the emergency drive 11 is then left to its own devices, the tension in the spring element 13 is released by it being coiled onto the second roller 14.

As a result of the resultant movement of the first roller 12 or of the second roller 14, the driven shaft 9 is driven until the desired end position is reached.

Figure 14:
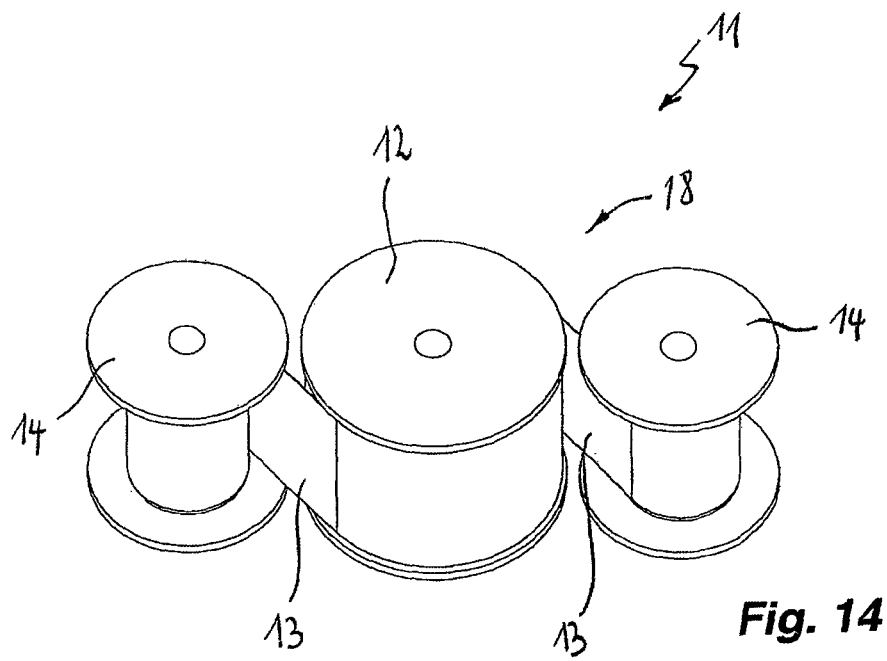
FIG. 14 shows a further embodiment according to the invention of an emergency drive with two band-shaped spring elements.
Figure 15:
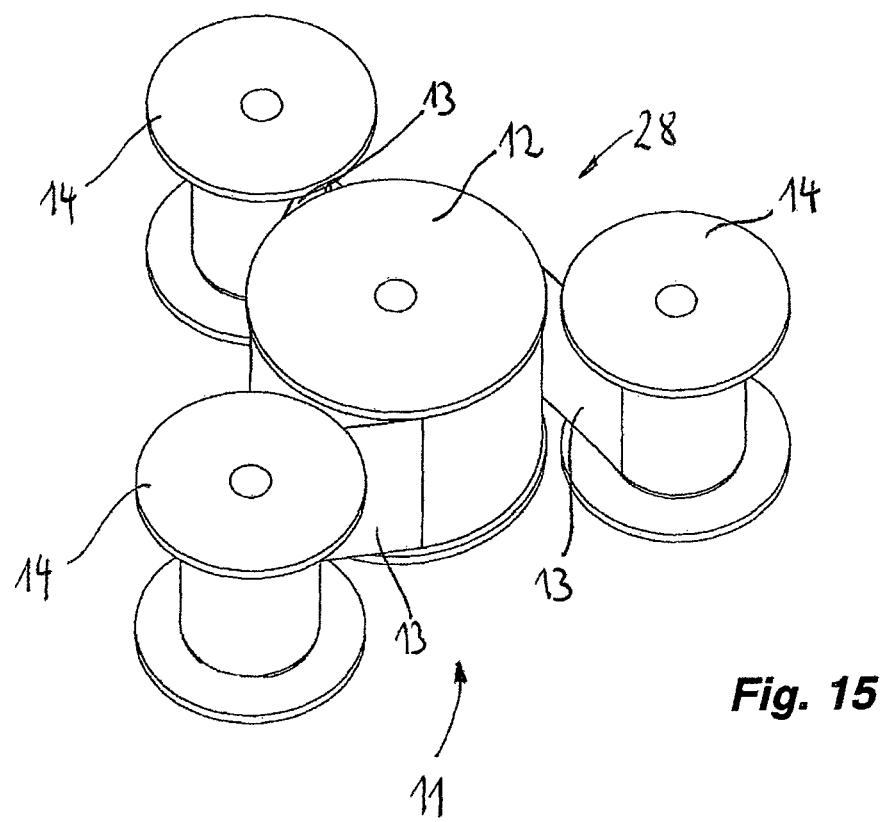
FIG. 15 shows a further embodiment according to the invention of an emergency drive with three band-shaped spring elements.

In the case of the valve closing devices 1 shown according to the invention, a constant force spring motor 28 according to FIG. 14 or a constant force spring motor 28 according to FIG. 15 can be used instead of the constant force spring motor 28 according to FIGS. 3 and 4.

The statement relating to FIGS. 3 and 4 apply correspondingly to FIGS. 14 and 15.

The constant force spring motor 28 of the emergency drive 11 according to FIG. 14 differs from the constant force spring motor 28 according to FIG. 3 in that there are two band-shaped spring elements 13 present which, offset with respect to one another in the circumferential direction, cooperate with the roller 12 which carries the spring elements 13 in the tensioned state.

A tensioning arrangement in which the spring elements 13 form a double-flight winding is produced as a result, i.e. a winding in which the spring elements 13 form layers which follow one after another alternately in the radial direction.

When the energy is released, each of the spring elements 13 is tensioned around a separate roller 14.

The drive shaft 38 (cf. FIG. 1) of the emergency drive 11, by means of which the emergency drive 11 acts on the superposition gear arrangement 16, is connected to the roller 12. Consequently, said drive shaft 38 is tensioned by the spring elements 13 when the energy is released, which is advantageous for the power transfer.

FIG. 15 shows an emergency drive 11 with a constant force spring motor 28 with three band-shaped spring elements 13. In this way, a triple-flight winding is produced in the tensioned state. Apart from this, the statements relating to FIG. 14 are applicable.

In the case of further exemplary embodiments, more than three spring elements 13 cooperate with one common roller 12 in order to form a multi-layered winding in the tensioned state. It can also be provided that said single, double or multi-layered winding defines the energy-releasing state. Here too, it is favorable when the drive shaft 38 is/are coupled with the roller or the rollers 12, 14 which is/are tensioned by the spring element or spring elements when the energy is released.

Another tensioning device 15 can be seen in FIG. 1 and the emergency drive 11 can be tensioned by way of said tensioning device. The tensioning device 15, in this connection, can be driven by electric motor or in a pneumatic or hydraulic or other manner, for example even manually.

Tensioning the emergency drive 11 can also be executable from the operation of the actuating drive 2 without a separate tensioning device 15.

Frequently the size of the reducing gear ratio of the gearing arrangement 20 (no self-locking in this case) is chosen such that it is not possible to tension the emergency drive 11 by way of the motor 4. A tensioning device 15 is present in this case.

In the case of a further exemplary embodiment, tensioning the emergency drive 11 can be made possible and carried out in a combination, that is an interaction, between the actuating drive 2 and the device 15.

The valve closing device 1 comprises a sensor 36 for this purpose. The sensor 36 can comprise a positioning sensor, speed sensor, torque sensor or in any other manner in order to detect a rotational movement of the driven shaft 9 and/or to differentiate between a standstill of the driven shaft 9.

A regulating device 37 is set up in this connection such that a rotational movement of the input shaft 10 is compensated for by the actuating drive 2 by a movement of the planet gear carrier 17 precisely in such a manner that a desired rotational movement of the driven shaft 9, for example a standstill, is achieved. Consequently, the achievement can be, for example, that the connected valve 3 is not moved during the tensioning of the emergency drive 11. For example, a valve of the valve 2 can be held in the open position or in the closed position in this way.

It can be seen in FIG. 1 that the power train from the emergency drive 11 and from the motor 4 are joined together in a superposition gear arrangement 16 and are forwarded together to the driven shaft 9.

Figure 6:
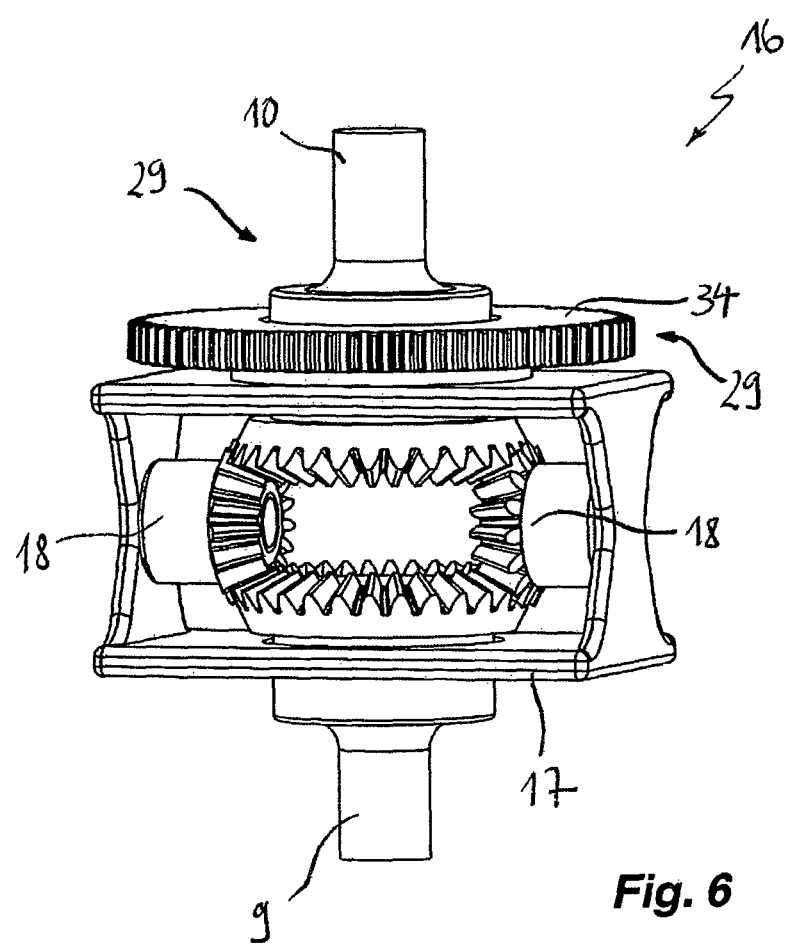
FIG. 6 shows a three-dimensional inclined representation of a superposition gear arrangement of a valve actuating assembly according to FIG. 1.
Figure 7:
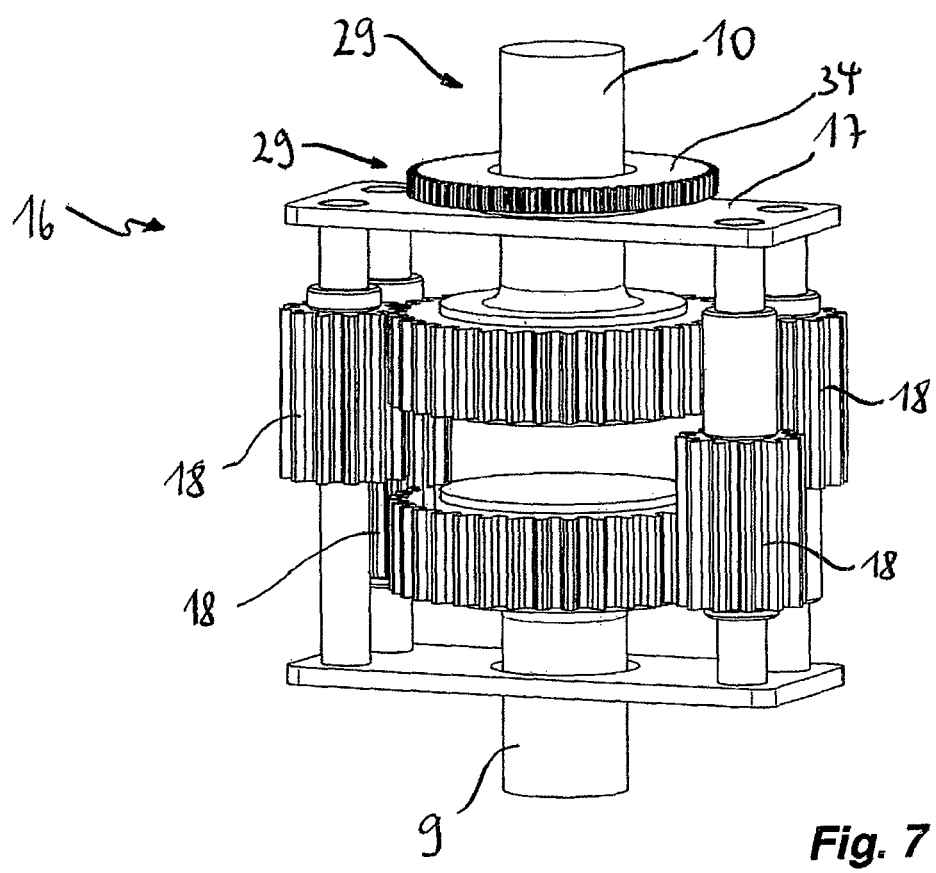
FIG. 7 shows a further superposition gear arrangement of a valve actuating assembly according to FIG. 1.

FIG. 6 and FIG. 7 show two examples of a usable superposition gear arrangement 16 which are realized in each case as differential gearing arrangements.

From the representations according to FIG. 6 and FIG. 7, it can be seen that the driven shaft 9 and the input shaft 10 describe the main power train through the superposition gear arrangement 16. In the case of further exemplary embodiments, further gearing arrangements can be interposed between the superposition gear arrangement 16 and the driven shaft 9 or the input shaft 10.

It can be seen in any case that the gear ratio between the driven shaft 9 and the input shaft 10 is one to one.

Planet gears 18 which produce the coupling between the input shaft 10 and the driven shaft 9 are arranged in each case on a planet gear carrier 17.

If the planet gear carrier 17 is blocked, the direct gearing ratio is produced between the driven shaft 9 and the input shaft 10. In this connection, the direction of rotation of the movement is reversed.

The emergency drive 11 cooperates with the planet gear carrier 17 by means of the geared wheel 34 and moves said planet gear carrier.

In this way, the torque introduced at the input point 29 by means of the input shaft 10 can be added to the torque introduced at the input point 29 by the emergency drive 11 by means of planet gear carrier 17.

The exemplary embodiment according to FIG. 6 shows a bevel differential gearing arrangement, while the exemplary embodiment according to FIG. 7 shows a spur differential gearing arrangement. Further types of differential gearing arrangements, for example planetary gearing arrangements, can be used in an advantageous manner.

Figure 18:
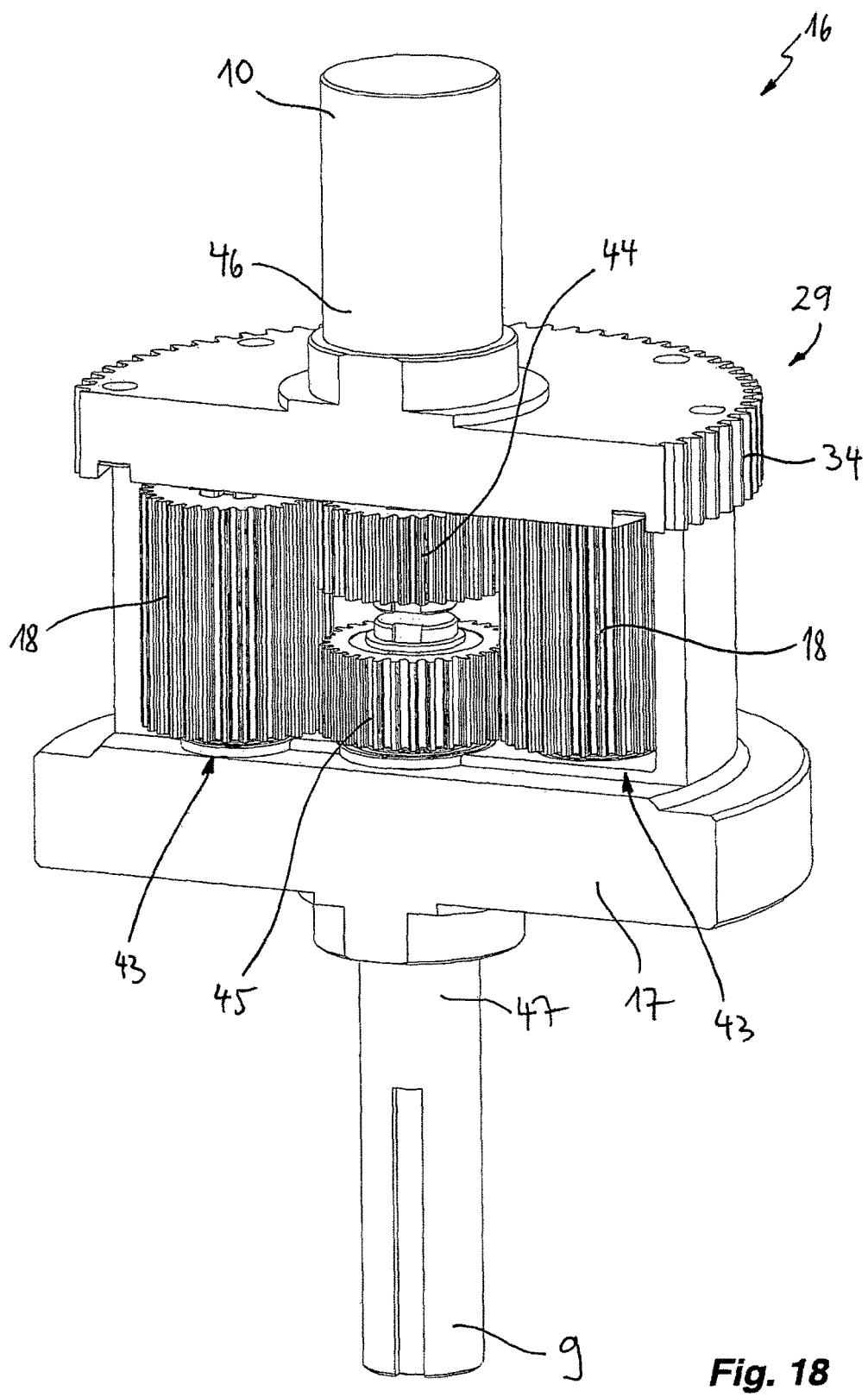
FIG. 18 shows a superposition gear arrangement of a valve actuating assembly according to the invention.

FIG. 18 shows a further superposition gear arrangement 16, as can be used and/or is used in the case of the valve closing devices 8 according to the invention of the shown and/or described valve actuating assemblies 1.

The superposition gear arrangement 16 is provided in this case as an epicyclic gearing arrangement and has an planet gear carrier 17, in this case a planet carrier which carries planet gears 18. The planet gears 18 form in each case a planet gear block 43.

The superposition gear arrangement 16 has a first sun wheel 44 and a second sun wheel 45 which are aligned coaxially with respect to one another.

The first sun wheel 44 is non-rotatably connected to the input shaft 46 of the superposition gear arrangement 16. The second sun wheel 45 is non-rotatably connected to the output shaft 47 of the superposition gear arrangement 16.

The input shaft 46 of the superposition gear arrangement 16 merges into the input shaft 10 of the valve closing device 8 or is rigidly coupled with said valve closing device.

The output shaft 47 of the superposition gear arrangement 16 merges into the output shaft 9 of the valve closing device 8 or is rigidly coupled with said valve closing device.

The sun wheels 44, 45 mesh in each case with the planet gears 18 of the planet gear blocks 43. As a result, there is a power train between the input shaft 46 and the output shaft 47.

The number of teeth on the sun wheels 44, 45 differs slightly from one another such that there is a gear ratio of almost one, but not precisely one, between the input shaft 46 and the output shaft 47 when the planet gear carrier 17 is held.

In this connection, flank forms, in particular the profile shifts, of the sun wheels 44, 45 are chosen so as to be different such that the points of engagement with the planet gears 18 are the same for both sun wheels 44, 45. The planet gears 18 are in each case integral and consequently comprise in each case a uniform number of teeth.

Consequently, a four-wheel planetary gearing arrangement is formed in the described manner as an epicyclic gearing arrangement.

Figure 19:
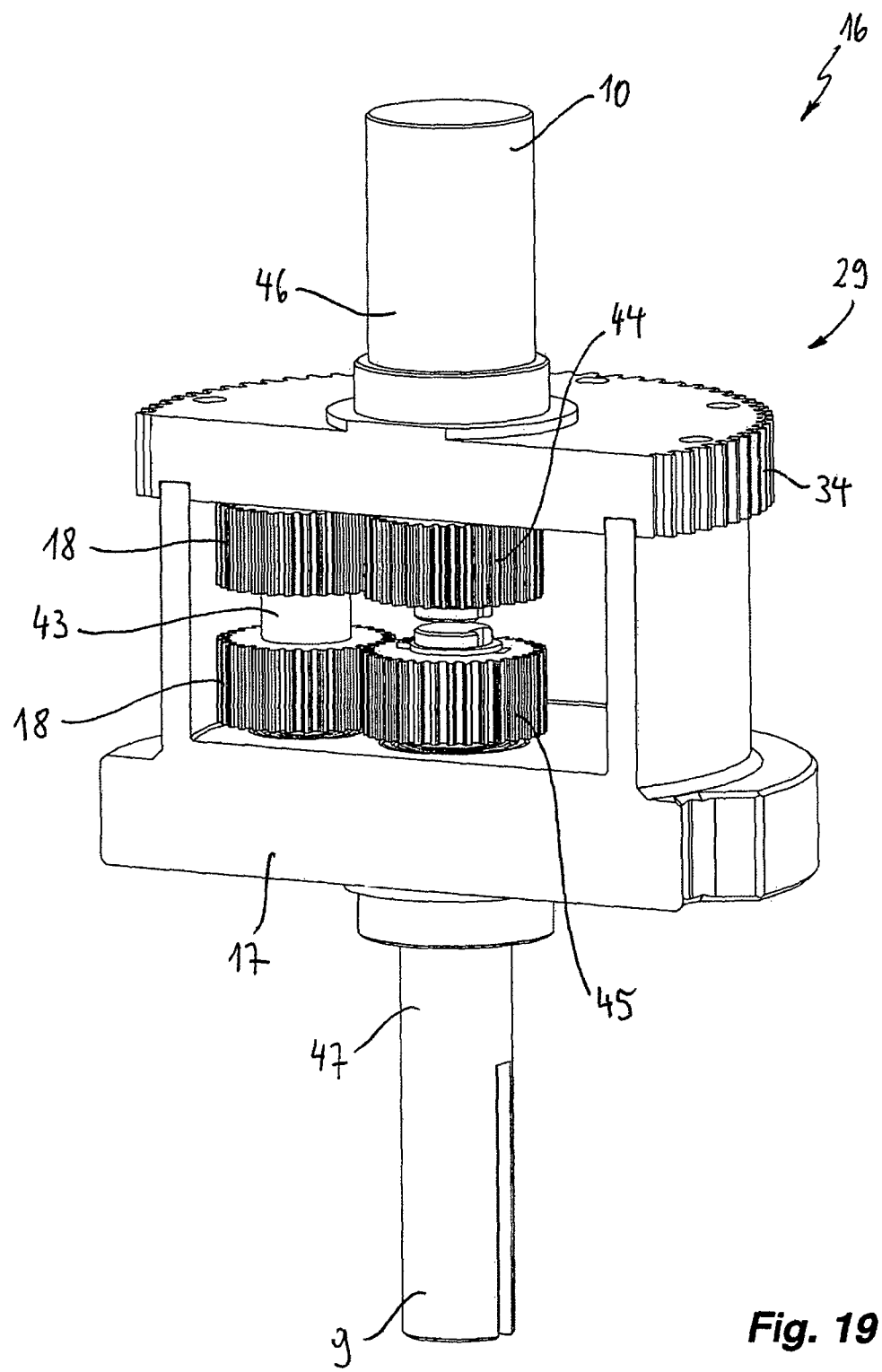
FIG. 19 shows the principle of operation of the superposition gear arrangement according to FIG. 18.

FIG. 19 shows a simplified representation of a basic design of the superposition gear arrangement 16 according to FIG. 18 for explaining a power train and the principle of operation as a four-wheel planetary gearing arrangement. The further toothing parts in FIG. 18 are provided for reinforcement and are unnecessary for the principle of operation. It is obvious that the planetary gear block 43 can be provided in a divided manner such that the sun wheels 44, 45 with the two planetary gears, the planet gears 18 of the planetary gear block 43 form a basic design of a four-wheel planetary gearing arrangement. Apart from this, the statements for explaining FIG. 18 are applicable to FIG. 19 in a corresponding manner.

In the case of further exemplary embodiments, each planetary gear block 43 comprises two separate planetary gears which are coupled non-rotatably on a common shaft and in each case only mesh with one of the two sun wheels 44, 45, as is shown as an example in FIG. 19.

In the case of said type of superposition gear arrangement 16 according to FIG. 18, the number of planetary gear blocks 43 used frequently matches the difference in the number of teeth of the sun wheels 44, 45.

In the exemplary embodiment according to FIG. 18, the difference in the number of teeth is 2 and there are precisely two planetary gear blocks 43.

The emergency drive 11 is coupled to the planet gear carrier 17 by the toothed wheel 34. As a result, there is a reduction gear ratio between the toothed wheel 34 and the output shaft 47 of 10 or more than 10. In the exemplary embodiment, the gear ratio between the input shaft 46 and the output shaft 47 with the toothed wheel 34 held is precisely at 1.1, and the gear ratio between the toothed wheel 34 and the output shaft 47 with the input shaft 46 held is precisely at 10. In the case of a further exemplary embodiment, the gear ratio between the input shaft 46 and the output shaft 47 with the toothed wheel 34 held is precisely at 1.066 and the gear ratio between the toothed wheel 34 and the output shaft 47 with the input shaft 46 held is precisely at 15. Other numeral values are also realizable as a result of choosing the number of teeth.

The superposition gear arrangement 16 consequently overrides the rotational movements on the input shaft 46 and on the toothed wheel 34 to form a rotational movement on the output shaft 47. The torques are added up in this connection.

It is obvious that—in contrast to the otherwise similar arrangement according to FIG. 7—the rotational movement between the input shaft 46 and the output shaft 47 is not reversed, but is transmitted in the same direction.

Apart from this, the explanations relating to FIGS. 6 and 7 are applicable in a corresponding manner to the exemplary embodiment according to FIG. 18 and FIG. 19.

Figure 16:
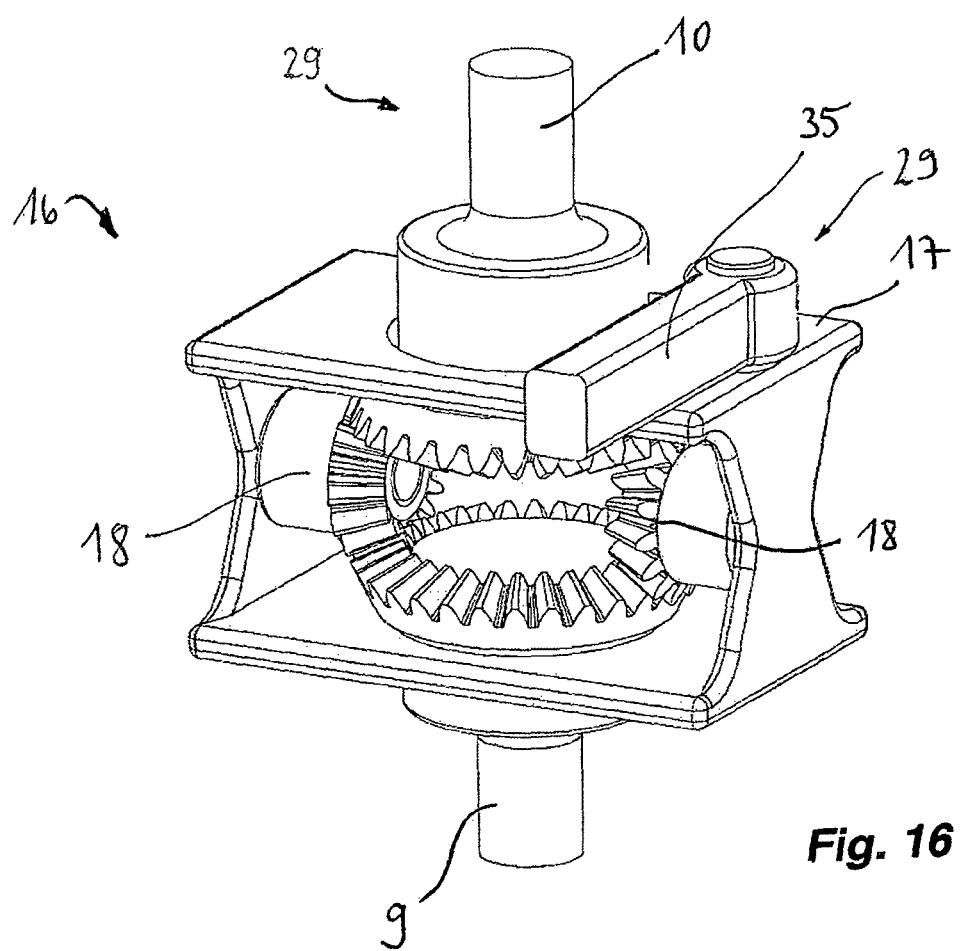
FIG. 16 shows a further embodiment according to the invention of a superposition gear arrangement.

In the case of a further exemplary embodiment according to FIG. 16, the emergency drive 11 does not engage via a toothed wheel, but by means of a drive element 35, here shown as an example as a connecting rod or crank or lever mechanism. By a gear ratio of 1:1 being realized between the input shaft 10 and the driven shaft 9, there is a gear ratio of 1:2 between the input point 29 of the emergency drive 11 and the driven shaft 9 with the input shaft 10 locked. Consequently, the planet gear carrier 17 rotating about 90° by means of the drive element 35, for example, with the input shaft 10 held, causes the driven shaft 9 to rotate about 180°. This travel is already sufficient for many applications.

Apart from this, the statements relating to FIGS. 1 to 6 are applicable to FIG. 16.

It can also be seen in FIG. 1 that the valve closing device 8 comprises a locking device 19.

The emergency drive 11 is lockable during mains operation and releasable in the event of mains failure using the locking device 19.

For this purpose, the locking device 19 comprises a self-locking gearing arrangement 20 which blocks a power train from the superposition gear arrangement 16 to the emergency drive 11, in one sense of direction.

The emergency drive 11, in this case, is not tensioned by the motor 4, but by means of the separate tensioning device 15.

If no self-locking gearing arrangement 20 is present, the emergency drive 11 can be tensioned by means of the superposition gear arrangement 16—for example with the driven shaft 9 held.

As an alternative to or in addition to the self-locking gearing arrangement 20, the locking device 19 comprises a pawl 21 which interacts in a blocking manner with a gearing part 22 in the locking position.

To this end, the pawl 21 engages in a corresponding recess 23 on the gearing part 22. The pawl 21 consequently locks in both senses of direction to the emergency drive 11 and from the emergency drive 11.

When the locking device 19 is released, the gearing part 22 is drivable by way of the emergency drive 11. The pawl 21 consequently blocks the emergency drive 11 in the engaged position.

FIG. 1 indicates that the pawl can cooperate with the emergency drive 11, the self-locking gearing arrangement 20 or the superposition gear arrangement 16 in order to bring about the locking process. In the case of further exemplary embodiments, gearing parts 22 of other devices of the valve closing device 8 can also be locked by way of a pawl 21. For example, the gearing part 22 can be realized on the planet gear carrier 17.

Figure 5:
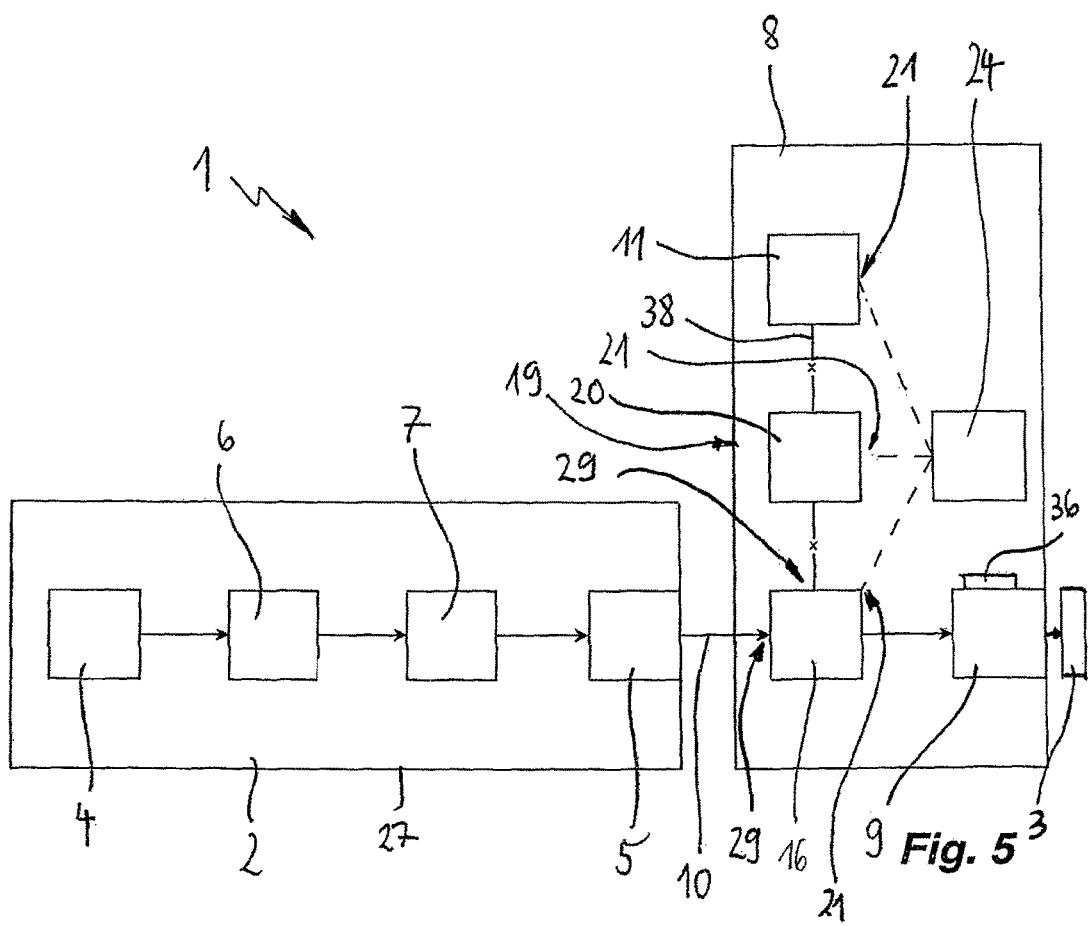
FIG. 5 shows the power train in a valve actuating assembly according to FIG. 1 in normal operation.

FIG. 5 shows the power train with the emergency drive 11 locked.

The power train in normal operation from the motor 4 to the drive shaft 9 is consequently shown. Once again the symbol "x" marks a power train interrupted by locking.

The locking device 19 has a disengaging device 24, by way of which the pawl 21 can be disengaged out of the recess 23 of the gearing part 22.

Figure 8:
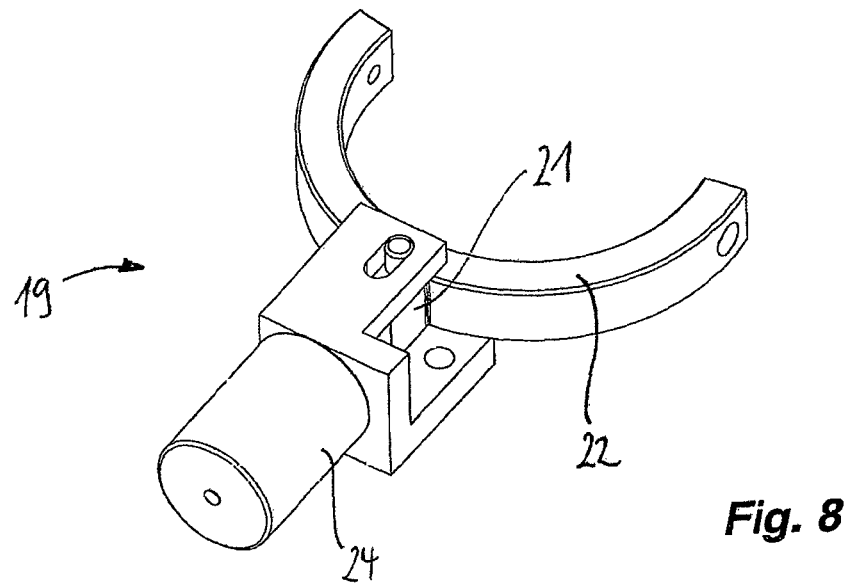
FIG. 8 shows a locking device of a valve actuating assembly according to FIG. 1.
Figure 9:
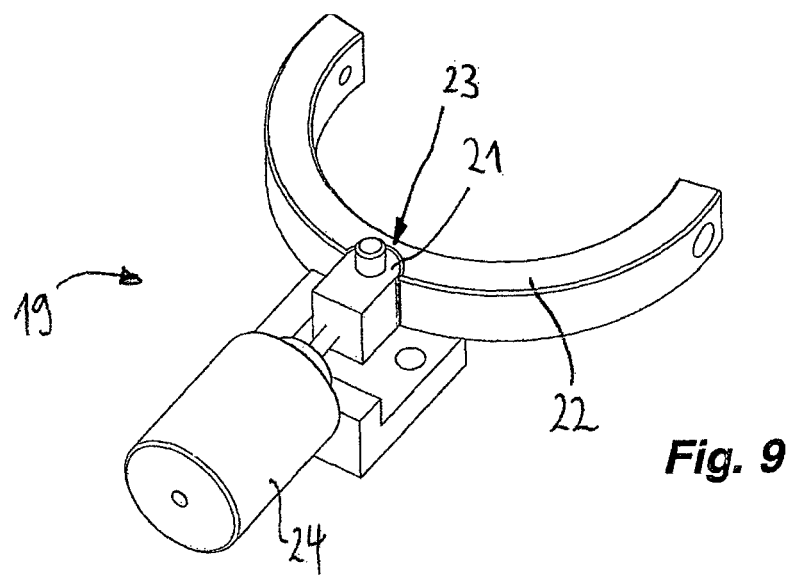
FIG. 9 shows a partially sectioned representation of the locking device according to FIG. 8.

FIG. 8 and FIG. 9 show an exemplary embodiment where the pawl 21 can be disengaged and engaged as a result of direct linear displacement.

The disengaging device 24 is realized here as an electrically actuatable lifting magnet. The lifting magnet can comprise a return spring which is not shown in any detail and is known per se.

Figure 10:
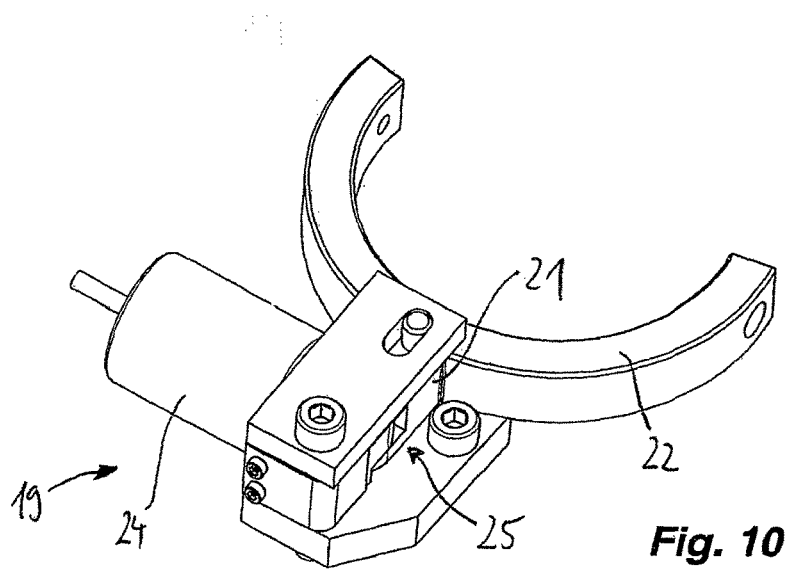
FIG. 10 shows a further locking device of a valve actuating arrangement according to FIG. 1 with a toggle lever.
Figure 11:
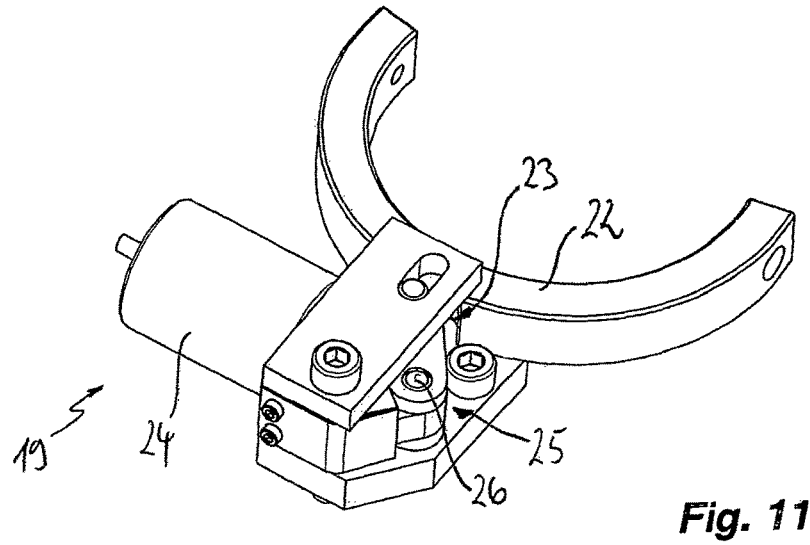
FIG. 11 shows the locking device according to FIG. 10 in the disengaged or releasing position.
Figure 12:
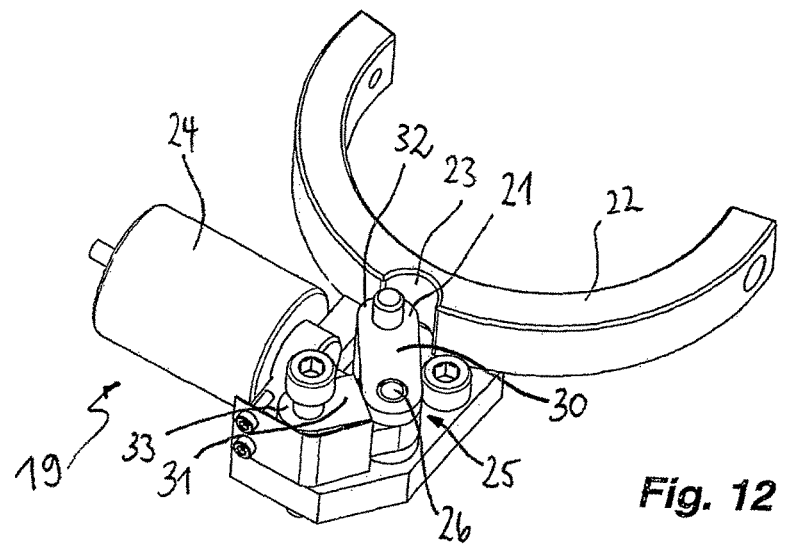
FIG. 12 shows a partially sectioned representation of the locking device in the position according to FIG. 11.

FIGS. 10 to 12 show an alternative locking device 19 for use in the valve actuating assembly 1 according to FIG. 1.

It is apparent that the pawl 21 is realized on the free end of a toggle lever 25.

FIG. 10 shows the extended toggle lever 25, while FIG. 11 shows the angled state of the toggle lever 25. The angled state of the toggle lever 25 consequently defines the releasing position of the locking device 19.

From the partially sectioned representation according to FIG. 12, it can be seen that the toggle lever 25 comprises a joint 26, the disengaging device 24—here a lifting magnet also—engaging in said joint. The toggle lever 25 is consequently formed by two legs 30, 31 which are connected by the joint 26. A free end which forms the pawl 21 is realized on the end of the one leg 30 remote from the joint 26. The toggle lever 25 is pivotably mounted on the end 33 of the other leg 31 remote from the joint 26.

The disengaging device 24 consequently engages in a transverse manner with reference to the direction of movement of the extended toggle lever 25 (cf. FIG. 10). The extended toggle lever 25 defines the locked position of the locking device.

The achievement as a result of using a toggle lever 25 can be that at the start of the disengaging movement a large force can be introduced onto the pawl 21 as the power transmission ratio of the disengaging device 24 to the pawl 21 with the toggle lever 25 extended is very favorable.

Consequently, it is possible to overcome large holding forces at the pawl 21 which are brought about as a result of clamping the gearing part 22.

Figure 13:
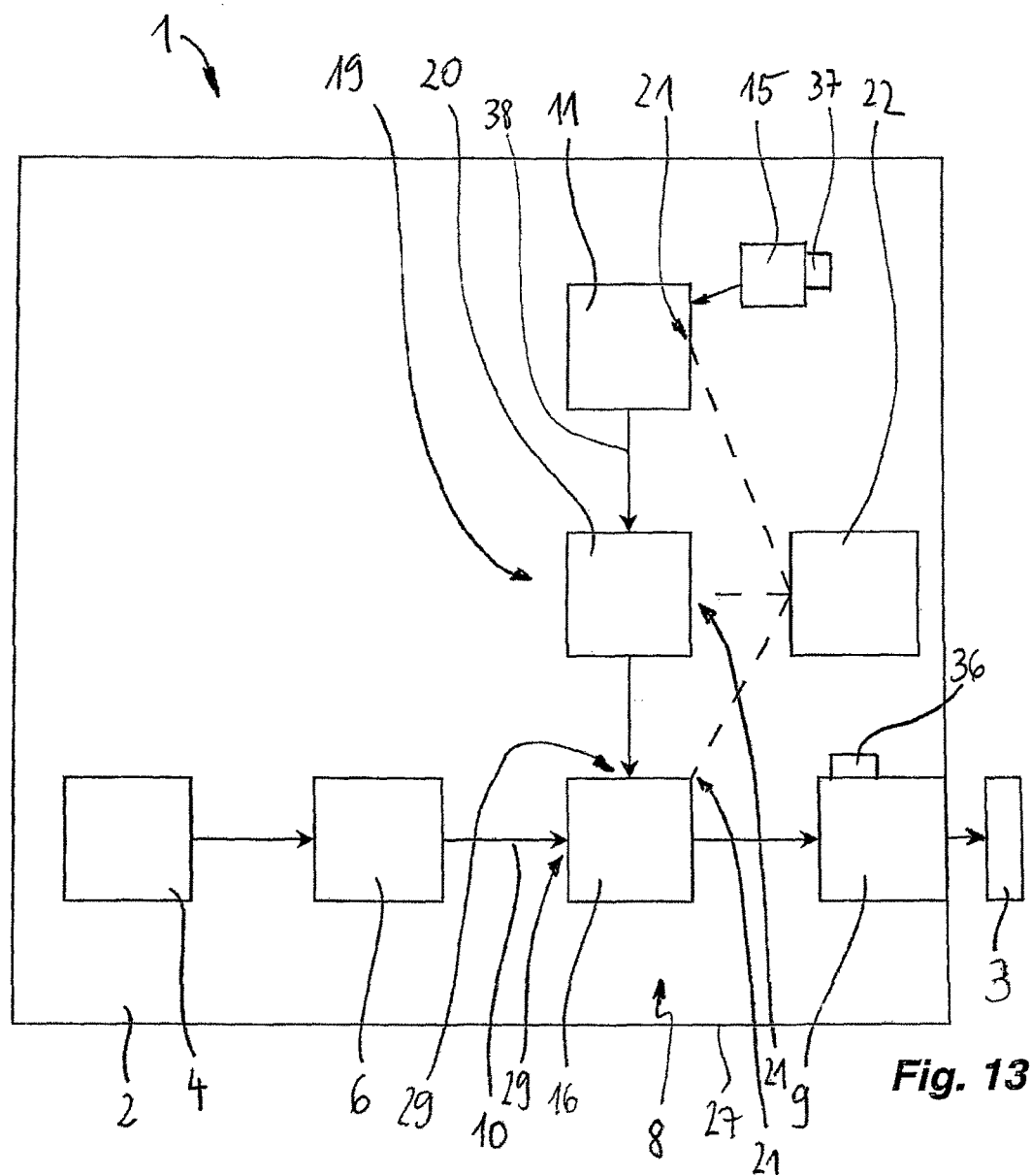
FIG. 13 shows a further valve actuating assembly according to the invention with an integrated valve closing device according to the invention.

FIG. 13 shows a further valve actuating assembly 1 according to the invention.

Components and functional units that are the same or similar functionally and/or structurally to the previously described exemplary embodiments are designated with the same references and are not described again separately. The statements relating to FIGS. 1 to 12 are consequently applicable in a corresponding manner to FIG. 13.

The valve actuating assembly 1 according to FIG. 13 differs from the valve actuating assembly 1 according to FIG. 1 in that the valve closing device 8 according to the invention is integrated into the actuating drive 2, that is into the housing 27 thereof.

The advantage of this, for example, is that the gearing 7 and the output 5 are able to be omitted in relation to FIG. 1.

In the case of the exemplary embodiment according to FIG. 13, the indicated valve 3 is also releasably connectable to the driven shaft 9 for producing an operative connection or driving connection.

Figure 17:
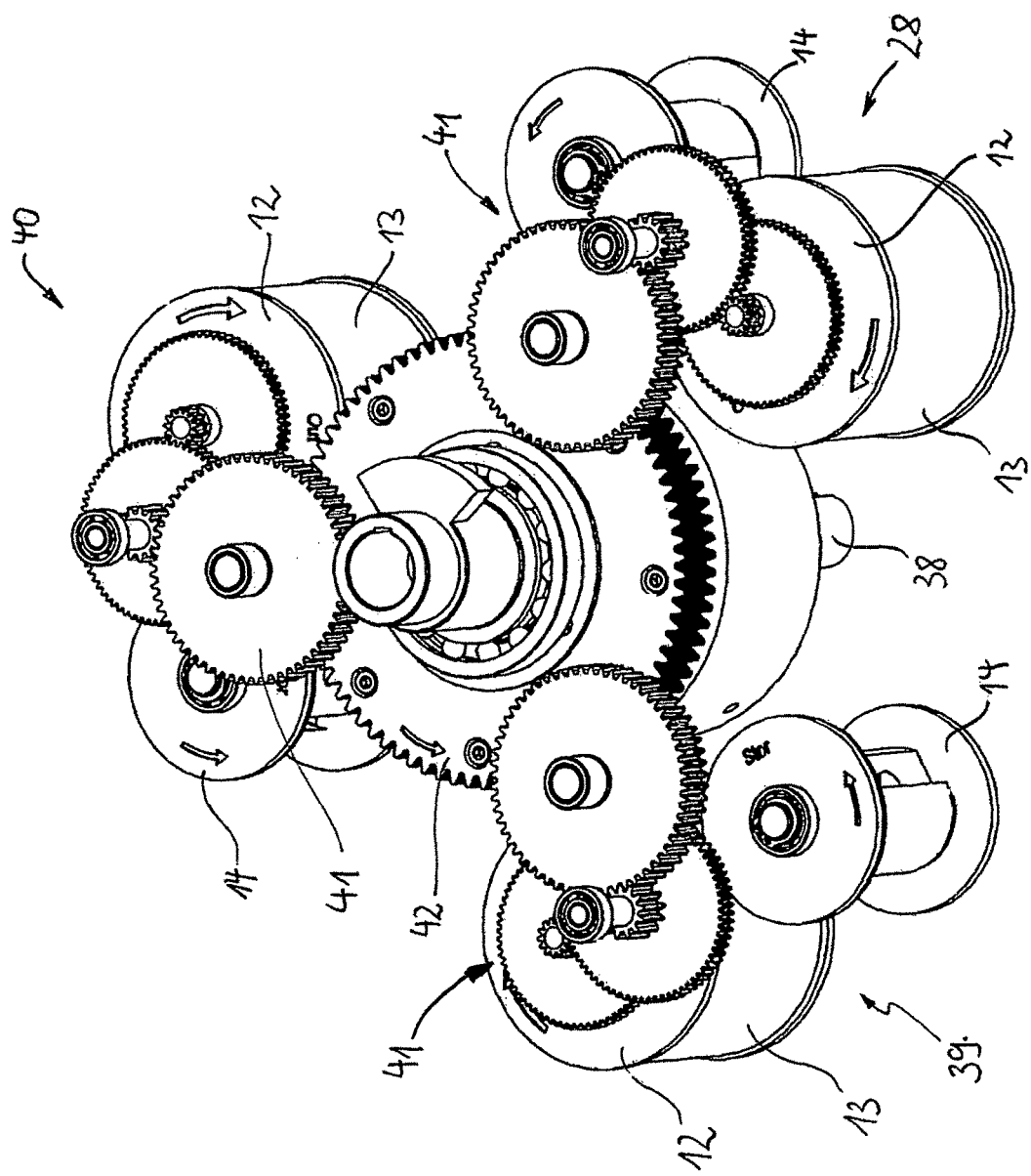
FIG. 17 shows an emergency drive of a further embodiment according to the invention with several constant force spring motors.

FIG. 17 shows a further emergency drive 11 of a valve closing device according to the invention, details which are not necessary for explaining the invention having been omitted.

The emergency drive 11 has a drive shaft 38 which can also be seen in the previously described Figures. This drive shaft 38 is non-rotatably coupled with a toothing part 42.

Three constant force spring motors 28, 39, 40 are uniformly distributed along the circumference of the toothing part 42 and cooperate with said toothing part.

In the case of further exemplary embodiments, a different number of constant force spring motors cooperate therewith.

The constant force spring motors 28, 39, 40 drive the common toothing part 42 together such that the individual torques of the constant force spring motors 28, 39, 40 are added up.

The constant force spring motors 28, 39, 40 are consequently connected in parallel together. Each of the constant force spring motors 28, 39 and 40 apply in each case a third of the overall required torque.

Each constant force spring motor 28, 39, 40 is drivingly connected to the toothing part 42 by means of a gearing arrangement 41, here a multi-stage reducing gear for speed reduction.

Apart from this, the function of each of the constant force spring motors 28, 39, 40 taken in isolation is as described previously. The statements consequently apply in a corresponding manner to FIG. 17, the same references having been retained.

In the case of a valve closing device 8 with a driven shaft 9 for connection to a valve 3 and an input shaft 10 for connection to an actuating drive 2, it is proposed, for driving the driven shaft 9 in the event of mains failure, to realize an emergency drive 11 as a constant force spring motor 28 and/or to join a power train from the emergency drive 11 to the driven shaft 9 with a power train from the input shaft 10 to the driven shaft 9 by means of a superposition gear arrangement 16 and/or to lock and to release the emergency drive 11 by way of a locking device 19.

The invention claimed is:

1. A valve closing device (8), comprising:
    a driven shaft (9),
    an input shaft (10) coupled to the driven shaft (9) by which the driven shaft (9) is drivable during operation,
    an emergency drive (11) that transfers the driven shaft (9) from a position of use into an end position, the emergency drive (11) comprises at least one constant force spring motor (28, 39, 40),
    the at least one constant force spring motor (28, 39, 40) comprises at least one band-shaped spring element (13) that is coiled in a spiral in a relaxed state,
    a further roller (14), the at least one band-shaped spring element (13) is wrapped on the further roller (14) for tensioning the at least one constant force spring motor (28, 39, 40),
    a superposition gear arrangement (16) by which the emergency drive (11) is coupled with the driven shaft and by which the input shaft (10) is coupled with the driven shaft (9), the superposition gear arrangement (16) comprises:
        a planetary gear that includes coaxially arranged first and second sun wheels (44, 45),
        the first sun wheel (44) is connected to the input shaft,
        the second sun wheel (45) is connected to the driven shaft, and
        a planetary gear block (43) that couples the sun gears (44, 45) together.

2. The valve closing device (8) as claimed in claim 1, wherein the at least one constant force spring motor (28, 39, 40) is tensionable by at least one of the input shaft (10) or a tensioning device (15).

3. The valve closing device (8) as claimed in claim 1, wherein the at least one constant force spring motor (28, 39, 40) comprises two or more of the band-shaped spring elements (13).

4. The valve closing device (8) as claimed in claim 3, wherein the constant force spring motor (28, 39, 40) is tensionable as a result of untensioning the at least one spring element (13), and in a tensioned state the at least one spring element (13) is tensioned in opposition to a tensioning direction of the constant force spring motor (28, 39, 40).

5. The valve closing device (8) as claimed in claim 1, wherein the emergency drive (11) comprises at least two of the constant force spring motors (28, 39, 40) connected in parallel or the at least one constant force spring motor (28, 39, 40) drives the driven shaft (9) by a multi-stage reduction gear.

6. The valve closing device (8) as claimed in claim 1, wherein the superposition gear arrangement (16) further comprises a planet gear carrier (17), and the emergency drive (11) drives the planet gear carrier (17).

7. The valve closing device (8) as claimed in claim 1, further comprising a regulating device (37) that regulates a tensioning device (15) of the emergency drive (15) such that a rotational movement of the input shaft (10) is compensated to stop a rotational movement of the driven shaft (9) when the emergency drive (15) is tensioned, and a sensor (36) connected to the regulating device (37) and that detects a rotational movement of the driven shaft (9).

8. The valve closing device (8) of claim 1, further comprising a locking device (19) set up for at least one of locking the emergency drive (11) in the event of mains operation or for releasing the emergency drive in the event of mains failure.

9. The valve closing device (8) as claimed in claim 8, wherein the locking device (19) is a self-locking gearing arrangement (20) which is drivable by the emergency drive (11) or the locking device (19) comprises a pawl (21) which is movable between a locking position and a releasing position, and in the locking position the pawl locks with a gearing part (22) which is drivable by the emergency drive (11).

10. The valve closing device (8) as claimed in claim 9, wherein the gearing part (22) is a planet gear carrier (17) of the superposition gear arrangement (16).

11. The valve closing device (8) as claimed in claim 9, wherein the pawl (21) is provided on a free end of a toggle lever (25).

12. The valve closing device (8) as claimed in claim 9, further comprising a motor-operated disengaging device (24) that is adapted to transfer the pawl (21) into the releasing position.

13. The valve closing device (8) as claimed in claim 12, wherein the disengaging device (24) comprises a lifting magnet.

14. A valve actuating assembly (1), having an actuating drive (2) for actuating, in the event of mains operation, a driven shaft (9) which is operatively connected to a valve (3) and having the valve closing device (8) according to claim 1 for actuating the driven shaft (9) in the event of mains failure.

15. The valve actuating assembly (1) as claimed in claim 14, wherein the valve closing device (8) is connected to the actuating drive (2) as a separate unit.

16. The valve actuating assembly (1) as claimed in claim 14, further comprising a valve (3) for producing an operative connection is connected to the driven shaft (9).

17. The valve closing device (8) as claimed in claim 1, wherein the at least one constant force spring motor (28, 39, 40) is tensionable by an electric motor driven tensioning device (15).

18. The valve closing device (8) as claimed in claim 1, wherein planetary gear block (43) comprises at least one planet gear (18).

\* \* \* \* \*